(12) United States Patent
Ji

(10) Patent No.: US 9,302,778 B2
(45) Date of Patent: Apr. 5, 2016

(54) DUAL HEAT EXCHANGER FUEL TANK INERTING SYSTEM

(71) Applicant: Hamilton Sundstrand Corporation, Windsor Locks, CT (US)

(72) Inventor: Changdae Ji, Manchester, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 255 days.

(21) Appl. No.: 13/961,418

(22) Filed: Aug. 7, 2013

(65) Prior Publication Data

US 2015/0040984 A1 Feb. 12, 2015

(51) Int. Cl.
*B64D 37/32* (2006.01)
*F02C 7/25* (2006.01)
*A62C 3/06* (2006.01)
*A62C 3/08* (2006.01)

(52) U.S. Cl.
CPC ........... *B64D 37/32* (2013.01); *Y10T 137/0318* (2015.04); *Y10T 137/6416* (2015.04)

(58) Field of Classification Search
CPC .......... A62C 3/08; A62C 3/065; B64D 37/32; F02C 7/25; Y10T 137/3127
See application file for complete search history.

(56) References Cited

U.S. PATENT DOCUMENTS

| 2005/0115404 | A1 | 6/2005 | Leigh et al. |
| 2005/0173017 | A1* | 8/2005 | Moravec et al. ............... 141/66 |
| 2006/0021652 | A1 | 2/2006 | Surawski |
| 2006/0117956 | A1* | 6/2006 | Schwalm ..................... 96/108 |
| 2007/0023577 | A1* | 2/2007 | Jones ....................... 244/135 R |
| 2008/0060523 | A1 | 3/2008 | Tom et al. |
| 2014/0053726 | A1* | 2/2014 | Evosevich et al. ............... 95/54 |
| 2014/0326135 | A1* | 11/2014 | Massey et al. .................... 95/39 |

FOREIGN PATENT DOCUMENTS

EP 2206646 A2 7/2010

OTHER PUBLICATIONS

European Patent Office, European Search Report, Jan. 16, 2015, 7 pages.

* cited by examiner

*Primary Examiner* — Atif Chaudry
(74) *Attorney, Agent, or Firm* — Kinney & Lange, P.A.

(57) ABSTRACT

A fuel tank inerting system includes a bleed air inlet, a bleed air conditioning system, an air separation module, a nitrogen-enriched air conditioning system, a nitrogen-enriched air outlet, and a controller. The bleed air conditioning system is connected to the bleed air inlet and is configured to cool bleed air. The air separation module is connected to the bleed air conditioning system and is configured to produce nitrogen-enriched air. The nitrogen-enriched air conditioning system is connected to the air separation module and is configured to cool nitrogen-enriched air. The controller controls nitrogen-enriched air temperature and nitrogen-enriched air flow rate at the nitrogen-enriched air outlet.

17 Claims, 1 Drawing Sheet

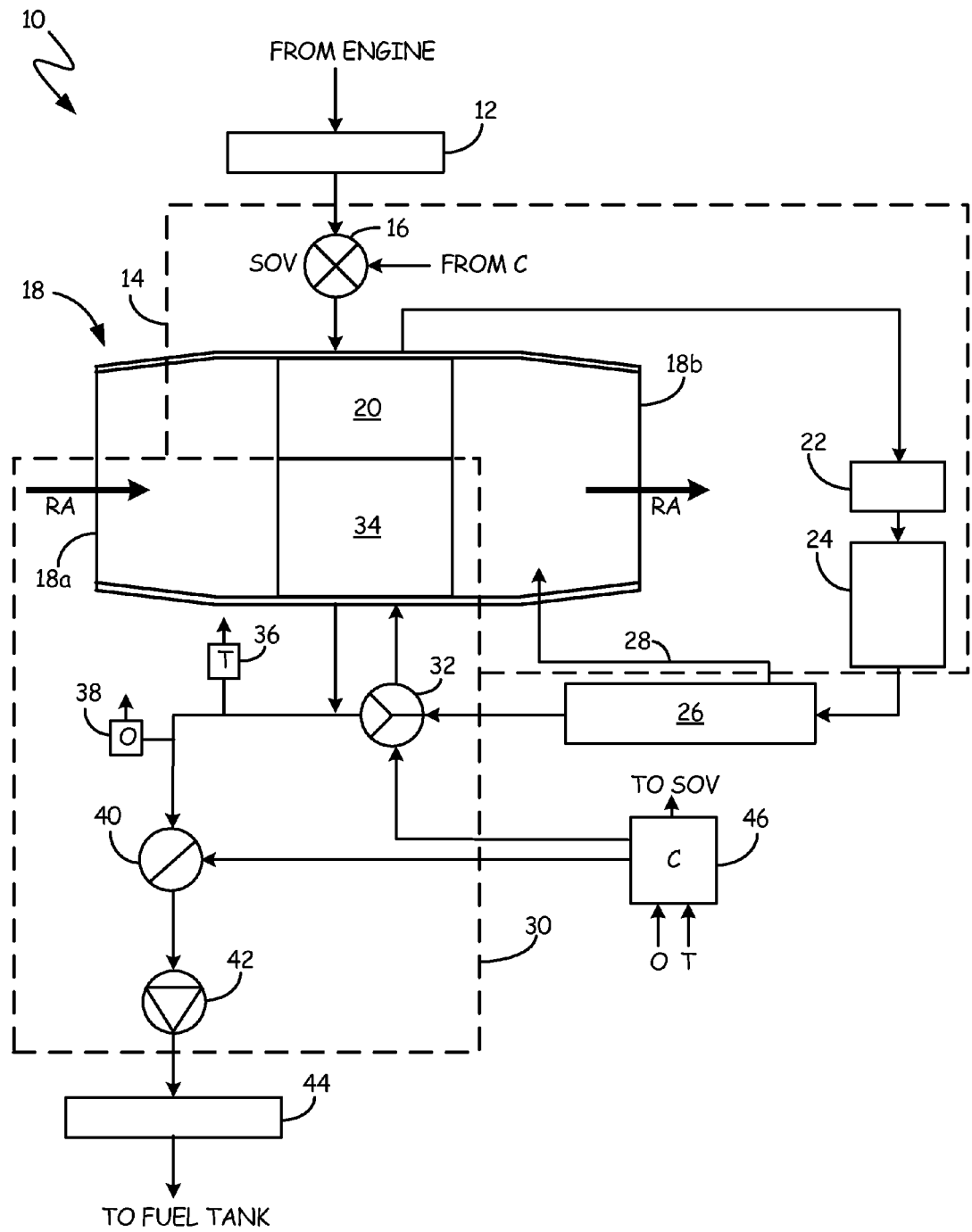

DUAL HEAT EXCHANGER FUEL TANK INERTING SYSTEM

BACKGROUND

The present invention relates generally to aircraft on-board systems and, more particularly, to on-board fuel tank inerting systems.

Fuel tank inerting systems are used to introduce an inert gas, such as nitrogen, into the fuel tanks of a vehicle, such as an aircraft. The inert gas displaces potentially dangerous fuel and air mixtures, thereby reducing the risk of explosion or fire. Typical on-board fuel inerting systems process an air source, such as bleed air taken from the engines of an aircraft. Bleed air leaving the engines is extremely hot and must be cooled for processing. However, cooling the bleed air to a safe temperature for fuel tank inerting requires expensive processing components.

SUMMARY

A fuel tank inerting system includes a bleed air inlet, a bleed air conditioning system, an air separation module, a nitrogen-enriched air conditioning system, a nitrogen-enriched air outlet, and a controller. The bleed air conditioning system is connected to the bleed air inlet and is configured to cool bleed air. The air separation module is connected to the bleed air conditioning system and is configured to produce nitrogen-enriched air. The nitrogen-enriched air conditioning system is connected to the air separation module and is configured to cool nitrogen-enriched air. The controller controls nitrogen-enriched air temperature and nitrogen-enriched air flow rate at the nitrogen-enriched air outlet.

BRIEF DESCRIPTION OF THE DRAWINGS

The Figure is a schematic diagram of a dual heat exchanger fuel tank inerting system according to an embodiment of the present invention.

DETAILED DESCRIPTION

The Figure is a schematic diagram of dual heat exchanger fuel tank inerting system 10, which receives bleed air from an aircraft engine, produces nitrogen-enriched air (NEA) from the bleed air, and provides NEA to the fuel tanks of the aircraft. Dual heat exchanger fuel tank inerting system 10 includes bleed air inlet 12; bleed air conditioning system 14 (which includes shut-off valve 16, ram air duct 18 with ram air inlet 18a and ram air outlet 18b, primary heat exchanger 20, filter 22, and ozone converter 24); air separation module 26 with overboard line 28; nitrogen-enriched air conditioning system 30 (which includes diverter valve 32, secondary heat exchanger 34, temperature sensor 36, oxygen-content sensor 38, flow control valve 40, and check valve 42); nitrogen-enriched air outlet 44; and controller 46.

Bleed air inlet 12 is connected to bleed air conditioning system 14. Shut-off valve 16 is located in bleed air conditioning system 14 and is connected between bleed air inlet 12 and primary heat exchanger 20. Primary heat exchanger 20 is positioned within ram air duct 18, which includes ram air inlet 18a and ram air outlet 18b. Primary heat exchanger 20 is connected between shut-off valve 16 and filter 22. Filter 22 is located in bleed air conditioning system 14 and is connected between primary heat exchanger 20 and ozone converter 24. Ozone converter 24 is located in bleed air conditioning system 14 and is connected between filter 22 and air separation module 26.

Air separation module 26 is connected between bleed air conditioning system 14 and nitrogen-enriched air conditioning system 30. Unwanted gas (i.e., oxygen-enriched air) leaves air separation module 26 through overboard line 28 and enters ram air duct 18. Air separation module 26 is connected between ozone converter 24 and diverter valve 32.

Diverter valve 32 is located at the inlet to nitrogen-enriched air conditioning system 30. Diverter valve 32 is connected to air separation module 26, secondary heat exchanger 34, and flow control valve 40. Secondary heat exchanger 34 is positioned within ram air duct 18 and is connected between diverter valve 32 and flow control valve 40. Temperature sensor 36 is connected between diverter valve 32 and flow control valve 40. Oxygen sensor 38 is connected between diverter valve 32 and flow control valve 40. Flow control valve 40 is connected between diverter valve 32 and check valve 42. Check valve 42 is connected between flow control valve 40 and nitrogen-enriched air outlet 44. Controller 46 is connected to temperature sensor 36, oxygen sensor 38, diverter valve 32, flow control valve 40, and shut-off valve 16.

Fuel tank inerting system 10 uses hot bleed air from the engine as an air source. Hot bleed air enters fuel tank inerting system 10 at bleed air inlet 12. Bleed air inlet 12 directs hot bleed air into bleed air conditioning system 14. Between bleed air inlet 12 and primary heat exchanger 20, shut-off valve 16, which is controlled by controller 46, may stop hot bleed air flow based on temperature or oxygen content signals received by the controller. Bleed air flowing through shut-off valve 16 enters primary heat exchanger 20, which is located within ram air duct 18. Ram air RA enters ram air duct 18 through ram air inlet 18a and leaves ram air duct 18 through ram air outlet 18b to provide cooling to primary heat exchanger 20. Cooled bleed air leaves primary heat exchanger 20 and enters filter 22, where particulate matter is removed. Filtered bleed air leaves filter 22 and enters ozone converter 24, where ozone in the bleed air is converted to oxygen. The ozone-depleted bleed air then leaves ozone converter 24 and bleed air conditioning system 14 and enters air separation module 26.

Air separation module 26 separates out unwanted gas, producing nitrogen-enriched air. Unwanted (i.e., oxygen-enriched) gas is provided from air separation module 26 through overboard line 28 to ram air duct 18, where it is routed overboard through ram air outlet 18b. Nitrogen-enriched air from air separation module 26 enters nitrogen-enriched air conditioning system 30.

In nitrogen-enriched air conditioning system 30, nitrogen-enriched air first encounters diverter valve 32. Diverter valve 32 is controlled by controller 46. Based on temperature and oxygen-content signals received by controller 46, diverter valve 32 directs nitrogen-enriched air to secondary heat exchanger 34, to nitrogen-enriched air outlet 44, or to both. Secondary heat exchanger 34 is located within ram air duct 18. Ram air RA enters ram air duct 18 through ram air inlet 18a and leaves ram air duct 18 through ram air outlet 18b to provide cooling to secondary heat exchanger 34.

Temperature sensor 36 senses the temperature of nitrogen-enriched air leaving diverter valve 32 and secondary heat exchanger 34. Oxygen sensor 38 senses the oxygen content of nitrogen-enriched air leaving diverter valve 32 and secondary heat exchanger 34. Controller 46 receives signals from temperature sensor 36 and oxygen sensor 38. Controller 46 controls the flow of nitrogen-enriched air from nitrogen enriched-air conditioning system 30 to nitrogen-enriched air outlet 44 at flow control valve 40 based on sensed temperature and oxygen content of the nitrogen-enriched air. Check valve 42 prevents back-flow of air through nitrogen-enriched air outlet 44 from the fuel tank into nitrogen-enriched air conditioning system 30.

Bleed air entering bleed air conditioning system 14 is extremely hot. Utilizing a single heat exchanger may effectively cool bleed air to a safe level for fuel tank distribution, but components for processing bleed air, such as an ozone converter and an air separation module, require higher temperatures for their chemical reactions than temperatures necessary for fuel tank safety. More expensive components may effectively process bleed air cooled to a safe level for fuel tank distribution, but a more efficient and cost-effective system may be desirable. By sensing the temperature of nitrogen-enriched air and selectively routing nitrogen-enriched air through a secondary heat exchanger as needed to meet safety standards for distribution to fuel tanks, less expensive components for processing bleed air may be used, enhancing component performance while meeting safety requirements for nitrogen-enriched air supplied to fuel tanks.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel tank inerting system comprising:
   a ram air duct having a bleed air inlet;
   a bleed air conditioning system connecting the bleed air inlet and an air separation module, the bleed air conditioning system comprising a primary heat exchanger positioned in the ram air duct;
   a nitrogen-enriched air conditioning system connecting the air separation module and a nitrogen-enriched air outlet, the nitrogen-enriched air conditioning system comprising a secondary heat exchanger positioned in the ram air duct, wherein the secondary heat exchanger is configured to receive nitrogen-enriched air from the air separation module and configured to provide cooled bleed air, and wherein the nitrogen-enriched air conditioning system further comprises a diverter valve configured to receive nitrogen-enriched air from the air separation module and configured to direct nitrogen-enriched air to the secondary heat exchanger, to a nitrogen-enriched air outlet, or to both; and
   a controller configured to control nitrogen-enriched air temperature and nitrogen-enriched air flow rate at the nitrogen-enriched air outlet.

2. The fuel tank inerting system of claim 1, wherein the primary heat exchanger is connected to receive bleed air from the bleed air inlet and provides cooled bleed air.

3. The fuel tank inerting system of claim 2, wherein the bleed air conditioning system further comprises a filter connected to receive cooled bleed air from the primary heat exchanger and to provide filtered cooled bleed air.

4. The fuel tank inerting system of claim 3, wherein the bleed air conditioning system further comprises an ozone converter connected to receive filtered cooled bleed air and to provide ozone-depleted filtered cooled bleed air.

5. The fuel tank inerting system of claim 2, wherein the bleed air conditioning system further comprises a shut-off valve connected between the bleed air inlet and the primary heat exchanger.

6. The fuel tank inerting system of claim 1, wherein the nitrogen-enriched air conditioning system further comprises a flow control valve connected between the diverter valve and the nitrogen-enriched air outlet.

7. The fuel tank inerting system of claim 6, wherein the nitrogen-enriched air conditioning system further comprises a check valve connected between the flow control valve and the nitrogen-enriched air outlet.

8. The fuel tank inerting system of claim 6 and further comprising a temperature sensor configured to sense the temperature of the nitrogen-enriched air and generate a temperature signal.

9. The fuel tank inerting system of claim 8 and further comprising an oxygen sensor configured to sense the oxygen content of the nitrogen-enriched air and generate an oxygen content signal.

10. The fuel tank inerting system of claim 9, wherein the controller is configured to control the diverter valve and the flow control valve based on the temperature signal and the oxygen signal.

11. The fuel tank inerting system of claim 1, wherein the air separation module is further configured to provide unwanted gas to the ram air duct.

12. A method of fuel tank inerting, the method comprising:
   receiving bleed air at a bleed air inlet of a ram air duct;
   routing ram air through the ram air duct;
   routing the bleed air through a first heat exchanger positioned in the ram air duct to cool the bleed air using the ram air;
   producing nitrogen-enriched air from the cooled bleed air;
   selectively routing nitrogen-enriched air through a second heat exchanger positioned in the ram air duct to cool at least a portion of the nitrogen-enriched air and controlling nitrogen-enriched air flow into the secondary heat exchanger with a diverter valve;
   supplying cooled nitrogen-enriched air from a nitrogen-enriched air outlet; and
   controlling nitrogen-enriched air temperature and flow rate based on at least one of sensed temperature and sensed oxygen content of the nitrogen-enriched air.

13. The method of fuel tank inerting of claim 12 and further comprising filtering the bleed air.

14. The method of fuel tank inerting of claim 12 and further comprising converting ozone to oxygen in the bleed air.

15. The method of fuel tank inerting of claim 12 and further comprising controlling bleed air flow into the primary heat exchanger with a shut-off valve.

16. The method of fuel tank inerting of claim 12 and further comprising controlling nitrogen-enriched air flow rate from the nitrogen-enriched air outlet with a flow control valve.

17. The method of fuel tank inerting of claim 12 and further comprising controlling nitrogen-enriched air flow based on a temperature signal and an oxygen signal.

* * * * *